(12) United States Patent
Giralde

(10) Patent No.: US 7,654,570 B2
(45) Date of Patent: Feb. 2, 2010

(54) SUPPORT LEG ASSISTANT

(76) Inventor: Barciliso Jerry Giralde, 3212 W. Floradora Ave., Fresno, CA (US) 93722

( * ) Notice: Subject to any disclaimer, the term of this patent is extended or adjusted under 35 U.S.C. 154(b) by 215 days.

(21) Appl. No.: 11/803,585

(22) Filed: May 15, 2007

(65) Prior Publication Data

US 2007/0221900 A1      Sep. 27, 2007

Related U.S. Application Data

(63) Continuation-in-part of application No. 10/905,899, filed on Jan. 25, 2005, now abandoned.

(51) Int. Cl.
B60S 9/12        (2006.01)
(52) U.S. Cl. .................. 280/766.1; 280/763.1
(58) Field of Classification Search .............. 280/763.1, 280/765.1, 766.1; 254/419
See application file for complete search history.

(56) References Cited

U.S. PATENT DOCUMENTS

| | | | |
|---|---|---|---|
| 2,238,411 A | | 4/1941 | Conklin |
| 2,776,148 A | * | 1/1957 | Geerds ..................... 280/766.1 |
| 3,139,266 A | | 6/1964 | Tew |
| 3,164,275 A | | 1/1965 | Schatzl et al. |
| 3,322,392 A | | 5/1967 | Hoffman |
| 3,563,567 A | | 2/1971 | Harp |
| 3,572,752 A | | 3/1971 | Harp |
| 3,589,748 A | | 6/1971 | Miller |
| 3,933,372 A | * | 1/1976 | Herndon ................... 280/763.1 |
| 3,944,259 A | * | 3/1976 | Miller ........................ 280/475 |
| 4,162,798 A | | 7/1979 | Foley |
| 4,779,888 A | | 10/1988 | Raymond |
| 4,863,184 A | | 9/1989 | Mena |
| 5,004,267 A | | 4/1991 | Busby |
| 5,067,746 A | * | 11/1991 | Baker ....................... 280/763.1 |
| 5,176,391 A | | 1/1993 | Schneider et al. |
| 5,188,379 A | | 2/1993 | Krause et al. |
| 5,205,586 A | * | 4/1993 | Tallman .................... 280/764.1 |
| 5,299,829 A | | 4/1994 | Rivers, Jr. et al. |
| 5,312,119 A | | 5/1994 | Schneider et al. |
| 5,340,143 A | * | 8/1994 | Williams, Jr. ............... 280/475 |
| 5,380,143 A | | 1/1995 | Mohan |
| 5,426,961 A | * | 6/1995 | Rimbaud et al. ............. 70/237 |
| 5,451,080 A | * | 9/1995 | Kneile ..................... 248/354.1 |
| 5,575,492 A | * | 11/1996 | Stone ......................... 280/475 |
| 5,575,493 A | | 11/1996 | Schwartz et al. |
| 6,089,603 A | * | 7/2000 | Ackley ..................... 280/765.1 |
| 6,726,236 B2 | * | 4/2004 | Cofer ......................... 280/475 |

(Continued)

*Primary Examiner*—Jeffrey J Restifo
(74) *Attorney, Agent, or Firm*—Richard A. Ryan

(57) ABSTRACT

A support leg assistant for use with a support jack having a telescoping support leg comprises an elongated housing member having a first end attached to the stationary outer tube of the jack and a second end extending outwardly from the jack. Preferably, housing member is generally horizontal and the second end thereof is at or near the edge of a trailer supported by the jack. An elongated pin extends through the housing member with a first end passing through a portion of the support leg in the outer tubing to hold the leg in position and a second end extending outwardly of the housing member to a handle. A elongated member, such as a cable, wire or rope, interconnects a crank with the bottom of the support leg so that the operator may raise, lower and secure the leg without crawling, bending or reaching under the trailer.

18 Claims, 7 Drawing Sheets

U.S. PATENT DOCUMENTS

| | | | |
|---|---|---|---|
| 6,726,247 B1 * | 4/2004 | Snyder | 280/766.1 |
| 6,764,065 B2 * | 7/2004 | Fox | 254/420 |
| 7,097,158 B2 * | 8/2006 | BarBaruolo | 254/419 |
| 7,377,488 B2 * | 5/2008 | Schutt | 254/419 |
| 2004/0108703 A1 * | 6/2004 | McGrew | 280/763.1 |
| 2006/0163858 A1 * | 7/2006 | Giralde | 280/763.1 |

* cited by examiner

SUPPORT LEG ASSISTANT

CROSS-REFERENCE TO RELATED APPLICATIONS

This application is a continuation-in-part of U.S. patent application Ser. No. 10/905,899 filed Jan. 25, 2005, now abandoned.

BACKGROUND OF THE INVENTION

A. Field of the Invention

The field of the present invention relates generally to structural support apparatuses configured to support a recreational vehicles, trailer or the like. More specifically, this invention relates to support jack systems having a downwardly extending, telescoping leg used to support a fifth wheel trailer or the like. Even more specifically, this invention relates to an apparatus for assisting the user with lowering and raising the telescoping leg.

B. Background

Many people utilize recreational vehicles to spend time camping, attending sporting events or traveling from one place to another. For purposes of this disclosure, recreational vehicles include those that connect to and are towed behind another vehicle, such as a car or truck, that has a ball and socket trailer hitch, a gooseneck coupler or a fifth wheel coupling. When the recreational vehicle is disconnected from the tow vehicle, a set of jacks are utilized to support the recreational vehicle above the ground or other support surface on which it rests. The most common types of support jacks, which are typically installed by the recreational vehicle manufacturer, are of the electric, pneumatic or hydraulic telescoping type having a stationary outer tube connected to the bottom of the recreational vehicle, a telescopically engaged support leg and a foot pad at the bottom end of the leg. The support leg extends downwardly and retracts back up, relative to the outer tube, to lower the foot pad to the support surface or raise it back toward the outer tube. Typically, the support jacks attach, often permanently, to the frame of the recreational vehicle.

One of the most popular types of recreational vehicle is the fifth wheel trailer, which has an overhang portion that extends forward of the main body of the trailer and a gooseneck component that attaches to and extends forward of the overhang portion. The fifth wheel trailer gooseneck connects to a fifth wheel coupler located on the tow vehicle, which is commonly in the bed of a pickup truck. The support jacks are attached to the bottom of the overhang portion of the fifth wheel trailer. When the fifth wheel trailer is being towed by the tow vehicle, the gooseneck connects to the coupler and the support jacks are in their raised or retracted position. The retractable leg and foot pad components of the jack are held in their retracted position by a locking pin that passes through both the telescoping support leg and the stationary outer tube.

When the operator desires to disconnect the fifth wheel trailer from the tow vehicle, he or she first lowers the leg and foot pad portion of the support jacks to their extended support position against the ground surface by crawling or reaching under the fifth wheel trailer's overhang portion and removing the locking pin. Removing the pin allows the operator to lower, by hand, the support leg and foot pad until they extend downwardly against the ground. Once the foot pad is resting on the ground, the operator reinserts the locking pin to secure the support leg in its extended position. Because the standard fifth wheel trailer has a pair of support jacks, this same procedure is repeated for the other side of the trailer. Then, he or she operates the powered jack assembly to raise the gooseneck off of the tow vehicle coupler. To reconnect the fifth wheel trailer to the tow vehicle coupler, the operator first positions the tow vehicle under the gooseneck to place the coupler under the gooseneck connector and then operates the powered jack assembly to lower the connector onto the coupler, thereby placing the weight of the trailer on the tow vehicle. The operator then raises the support jacks by crawling or reaching under the fifth wheel trailer overhang, pulling the locking pin from the support jack, raising the support leg and foot pad by hand to their retracted position and then reinserting the pin to secure the leg in its retracted position. This is repeated for the other support jack.

As fifth wheel trailers are primarily utilized in outdoor settings, it is not unusual for water, snow, dirt, mud or other elements on the ground to be an issue with the process of crawling or reaching under the fifth wheel trailer overhang to raise or lower the support jacks to their retracted or extended positions. Besides the mud or other elements, the support jack components that are handled by the operator also tend to have road grime or other materials on them, which is typically transferred to the operator's hands, clothes and/or gloves. For many people, crawling or reaching under a fifth wheel trailer overhang to disengage or engage the support jacks is at least somewhat uncomfortable and, for some, very difficult. In addition to the process being generally dirty and uncomfortable, crawling or reaching under the overhang can result in injury to the operator's back or head.

Over the years, various devices have been proposed to make the process of raising, lowering or leveling a trailer cleaner, less uncomfortable and safer. For instance, U.S. Pat. No. 7,097,158 to BarBaruolo discloses a lift mechanism for fifth wheel trailers that comprises an L-shaped main tube that attaches to the ram tube, a handle that is attached to one end of a cable passing through a hollow telescoping tube which is clamped to the main tube, an eye bolt that interconnects the opposite end of the cable to the foot pad and a pulley over which the cable passes. To raise the foot pad, the operator pulls the handle and cable to move the foot pad to its retracted position and then locks it in place with the locking pin. Once raised, the telescoping tube is collapsed for storage. While this patent does generally describe a device for assisting the operator in raising and lowering the support leg and foot pad without having to be under the trailer to accomplish this task, it does so in a somewhat complicated manner. In addition, the device does not eliminate the requirement for the operator to crawl or reach under the trailer to remove and reinsert the locking pin.

Various other devices are described in the prior art. For instance, U.S. Pat. No. 5,299,829 to Rivers, Jr., et al. describes a pneumatic system for raising and lowering the landing legs on a semi trailer. In one embodiment, the system includes a remote control unit which has a radio receiver that operates solenoids in a landing gear valve to control which air line supplies the pneumatic motor with air to control the direction of rotation of the motor in order to raise or lower the landing gear. U.S. Pat. No. 5,575,493 to Schwartz, et al. describes a hydraulic lifting device for a gooseneck trailer. The device uses a remote control unit that is hard-wired to an electric motor or a hydraulic pump and a solenoid in a hydraulic valve to control the direction of fluid flow and, hence, the raising or lowering of the trailer. U.S. Pat. No. 4,863,184 to Mena discloses a landing gear mechanism having telescoping legs with locking pins activated by solenoids to lock the legs in position. The legs are operated by an electric motor from a control unit which has relays that activate sensors on the legs which detect if the legs are in locking position. The patent mentions that the control may be activated by remote control. U.S. Pat. No. 5,004,267 to Busby teaches a system for raising and lowering the landing gear legs on a semi trailer which uses an air motor supplied with compressed air from the tractor as the power unit for raising and lowering the legs. U.S. Pat. Nos. 5,176,391 and 5,312,119 to Schneider describe a hydraulic leveling system for a recreational vehicle which employs three hydraulic jacks under control of a microprocessor controlled circuit. The system includes a pneumatic air bag system and indicators to show when the parking brake is released or when the transmission is shifted. U.S. Pat. No. 5,188,379 to Krause, et al. shows an automatic leveling system for a recreational vehicle that uses four hydraulic jacks and has a control pad wired to a microprocessor for controlling the leveling system manually.

While the foregoing patents generally describe apparatuses and systems that generally provide some benefits for raising or leveling a trailer, they have not heretofore effectively solved the problem of the operator of a fifth wheel trailer or other recreational vehicle having to reach under a portion of the trailer to lower and raise the support jacks and then secure it in its raised or lowered position. What is needed, therefore, is an improved apparatus for assisting an operator with raising and lowering, and then securing in the raised or lowered position, the leg of a support jack utilized with a recreational vehicle such as a fifth wheel trailer. The preferred apparatus should allow the operator to raise or lower and secure the support jack leg without crawling under, bending down or reaching below a portion of the trailer. Preferably, the apparatus should be configured for the operator to be at the side of the trailer when raising, lowering and securing the leg of a support jack. The preferred apparatus should be simple to install, easy to operate and adaptable to a variety of different configurations of support jacks.

SUMMARY OF THE INVENTION

The support leg assistant of the present invention solves the problems and provides the benefits identified above. That is to say, the present invention discloses a new and improved apparatus for assisting the operator of a recreational vehicle, such as a fifth wheel trailer, with raising, lowering and securing the telescoping leg of a support jack. The support leg assistant of the present invention connects to the support jack and is operated in a manner that allows the operator to raise, lower and secure the telescoping leg of the support jack without crawling under, bending down or reaching below a portion of the recreational vehicle. When using the support leg assistant of the present invention to raise or lower and secure the support jack in place, the operator can stand on the outside of the trailer. As such, the support leg assistant of the present invention substantially eliminates the need for the operator to directly handle the support leg, foot pad or any other component of the support jack, thereby reducing the likelihood of getting dirty or hurt, when raising or lower the support jack. The preferred configuration of the support leg assistant of the present invention is simple to install on the support jack, easy to operate and adaptable to a variety of different configurations of support jacks.

In one general aspect of the present invention, the support leg assistant generally comprises an elongated housing member, an elongated pin extending through the housing member and a mechanism attached to the housing member for raising or lowering the support leg. The elongated housing member has a first end that attaches to a stationary component of the support jack and a second end that extends outwardly of the support jack. In a preferred embodiment, housing member is generally U-shaped with the first end being open and the second end being closed such that the first end can be removably clamped around the stationary outer tube of the support jack. Preferably, the housing member extends generally horizontally outwardly from the support jack such that the second end of the housing member is at or near the edge of a trailer or other object supported by the support jack. The elongated pin is received in and extends through the entire length of the housing member such that the first end of the pin selectively engages an aperture in the support leg, where it is disposed in the stationary component, when the support jack is in a secured position and the second end of the pin extends beyond the second end of the housing member. In a preferred embodiment, the elongated pin extends through an aperture in a support plate interconnecting opposing sides of the U-shaped housing member. Preferably, a handle is attached to or integral with the second end of the elongated pin. The mechanism for raising and lowering the lower end of the support leg moves it between the support jack's upper retracted position and its lower extended position. In a preferred embodiment, the mechanism comprises a crank rotatably attached to the housing member near the second end thereof, an elongated member interconnecting the crank and the lower end of the support leg and a guiding mechanism disposed in the housing member between the crank and the first end of the housing member for directing the elongated member to the lower end of the support leg. The elongated member can be a cable, wire, rope or the like. The guiding mechanism can be a pin disposed between the sides of the housing member, a pulley or like mechanisms that allow the elongated member to pass over. Preferably, the support leg assistant includes one or more securing mechanisms for securing the first end of the pin in the support leg so as to maintain the support jack in its secured position. In one embodiment, the securing mechanism includes a key slot at the second end of the housing member and a correspondingly configured key member on the pin, with the key member being configured to fit through the key slot by twisting the elongated pin when the operator desires to place the support jack in a released position. In the preferred embodiment of the present invention, the securing mechanism also includes a securing pin that is removably received in a securing aperture in the pin.

In use, the operator removes the securing pin from the securing aperture, grasps the handle, twists the handle to rotate the elongated pin and align the key member with the key slot, and then pulls outwardly on the elongated pin to disengage it from the portion of the support leg in the outer tube so as to allow the support leg to move freely of the outer tube. If the support jack was in its extended position, the operator rotates the crank to reel in the elongated member and raise the foot pad off of the ground and the support leg into the outer tube. Once the foot pad is sufficiently raised, the operator twists the elongated pin to align the key member with the key slot and pushes the elongated pin inward to engage its first end with the aperture in the outer tube and in the alignment with the housing member. The operator then reinserts the securing pin into the securing aperture to secure the pin in place. If the support jack was in the retracted position, the operator repeats the above steps except that he or she will likely not need to rotate the crank to lower the foot pad as the weight thereof is generally sufficient to pull support leg and elongated member down.

Accordingly, the primary objective of the present invention is to provide a support leg assistant that provides the advantages discussed above and overcomes the disadvantages and limitations associated with presently available apparatuses for raising and lowering a support jack leg.

It is also an important object of the present invention to provide a support leg assistant for use with recreational vehicles, particularly fifth wheel trailers, that eliminates the need to crawl, bend or reach under a portion of the trailer to raise, lower and secure the telescoping leg of the support jack.

It is also an important object of the present invention to provide a support leg assistant for use with recreational vehicles, particularly fifth wheel trailers, that allows the operator to stand next to the trailer while raising, lowering and securing the telescoping leg of the support jack.

It is also an important object of the present invention to provide a support leg assistant for use with recreational vehicles, particularly fifth wheel trailers, that at least substantially eliminates the need for the operator to directly handle the support leg, foot pad or any other component of the support jack so as to reduce the likelihood of the operator getting dirty or hurt when raising or lower the support jack leg.

It is also an important object of the present invention to provide a support leg assistant for use with recreational vehicles, particularly fifth wheel trailers, that comprises an elongated housing member that attaches to the stationary portion of a support jack and extends outwardly thereof to an edge of the trailer, an elongated pin that extends through the housing member and a crank mechanism having an elongated member interconnecting a crank and the lower end of the support leg.

It is also an object of the present invention to provide a support leg assistant for use with recreational vehicles that is simple to install, easy to operate and adaptable to a variety of different configurations of support jacks.

The above and other objectives of the present invention will be explained in greater detail by reference to the attached figures and the description of the preferred embodiment which follows. As set forth herein, the present invention resides in the novel features of form, construction, mode of operation and combination of processes presently described and understood by the claims.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed figures and drawings are merely illustrative of a preferred embodiment and represent one of several different ways of configuring the present invention. Although specific components, materials, configurations and uses are illustrated, it should be understood that a number of variations to the components and to the configuration of those components described herein and in the accompanying figures can be made without changing the scope and function of the invention set forth herein. For instance, although the figures and description provided herein are primarily directed to use of the support leg assistant with support jack utilized on a fifth wheel trailer, those skilled in the art will readily understand that this is merely for purposes of simplifying the present disclosure and that the present invention is not so limited. For instance, the present invention may be equally applicable for use with other types of trailers and support jacks.

Figure 1:
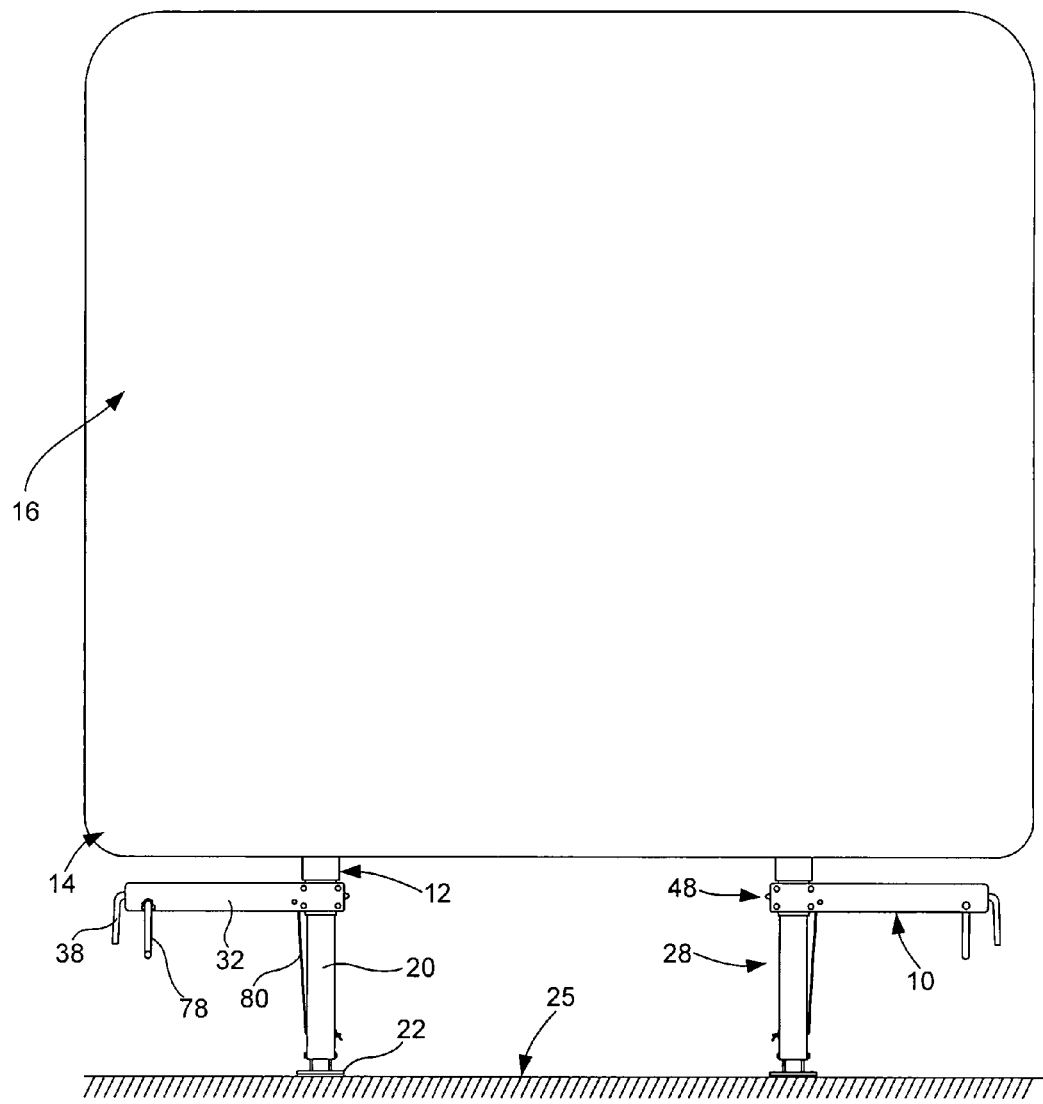
FIG. 1 is a front view of the overhang portion of a fifth wheel trailer showing a support leg assistant configured according to a preferred embodiment of the present invention attached to the support jack supporting the trailer.

A support leg assistant that is manufactured out of the components and configured pursuant to a preferred embodiment of the present invention is shown generally as 10 in the figures. As best shown in FIG. 1, support leg assistant 10 of the present invention is particularly configured for use with a support jack 12 that is used to support an object, such as the overhanging end 14 of a fifth wheel trailer 16 or other recreational vehicle. As shown in FIG. 1, typically a pair of support jacks 12 are utilized, one toward each side of the fifth wheel trailer 16. As set forth in more detail below, support leg assistant 10 attaches to the stationary outer or ram tube 18 component of support jack 12 to raise, lower and secure telescoping support leg 20. In a preferred embodiment, support leg assistant 10 removably clamps onto outer tube 18. A foot pad 22 is attached to the lower end 24 of leg 20 and is configured to rest on the ground or other support surface 25. During use, the upper end 26 of leg 20 is received into and extends downwardly from outer tube 18. Support leg 20 of support jack 12 is shown in its lowered or extended position 28 in FIGS. 1 through 3 and 8, and is shown in its raised or retracted position 30 in FIGS. 4 through 6.

Figure 4:
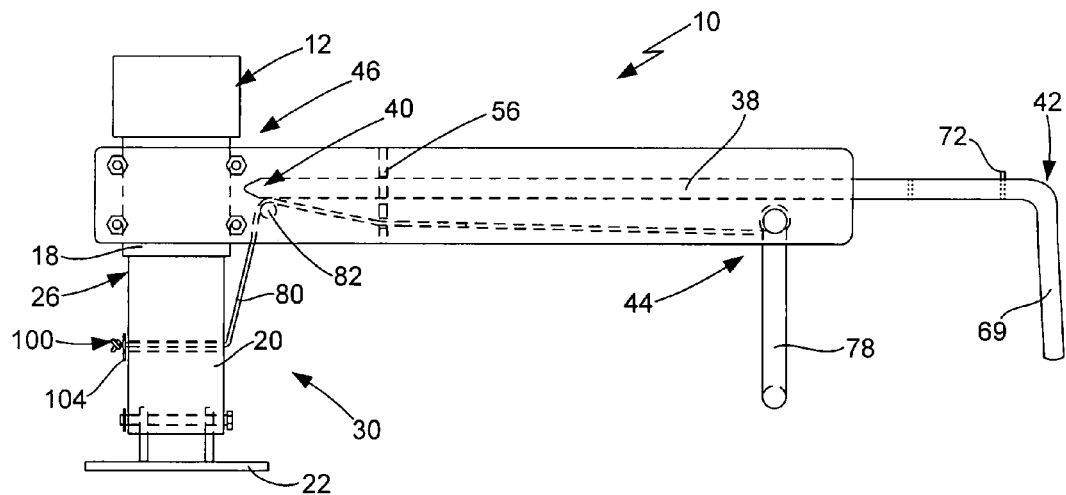
FIG. 4 is a front view of the support leg assistant and support leg of FIG. 2 shown with the leg and foot pad in its raised or retracted position and the elongated pin withdrawn from its engagement with the leg and outer tube.
Figure 5:
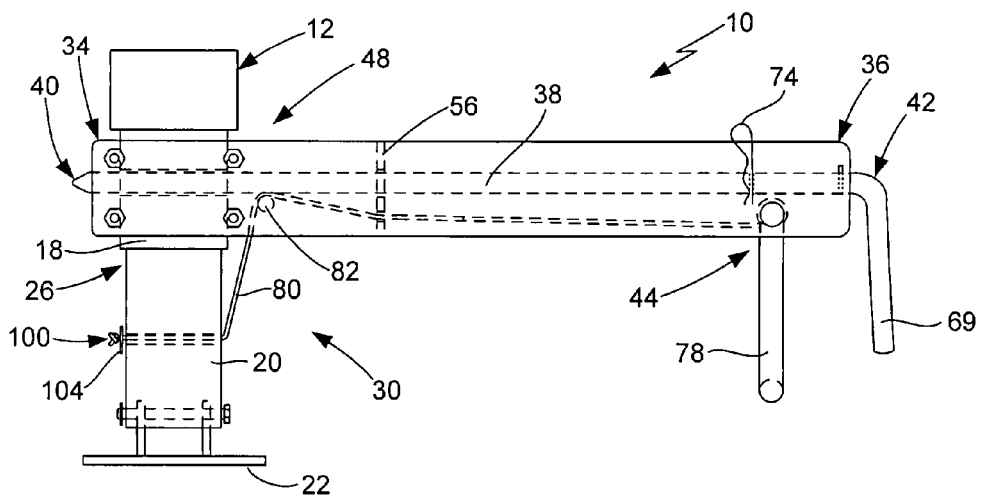
FIG. 5 is a front view of the support leg assistant and support leg of FIG. 4 with the elongated pin placed in engagement with the leg and outer tube.
Figure 6:
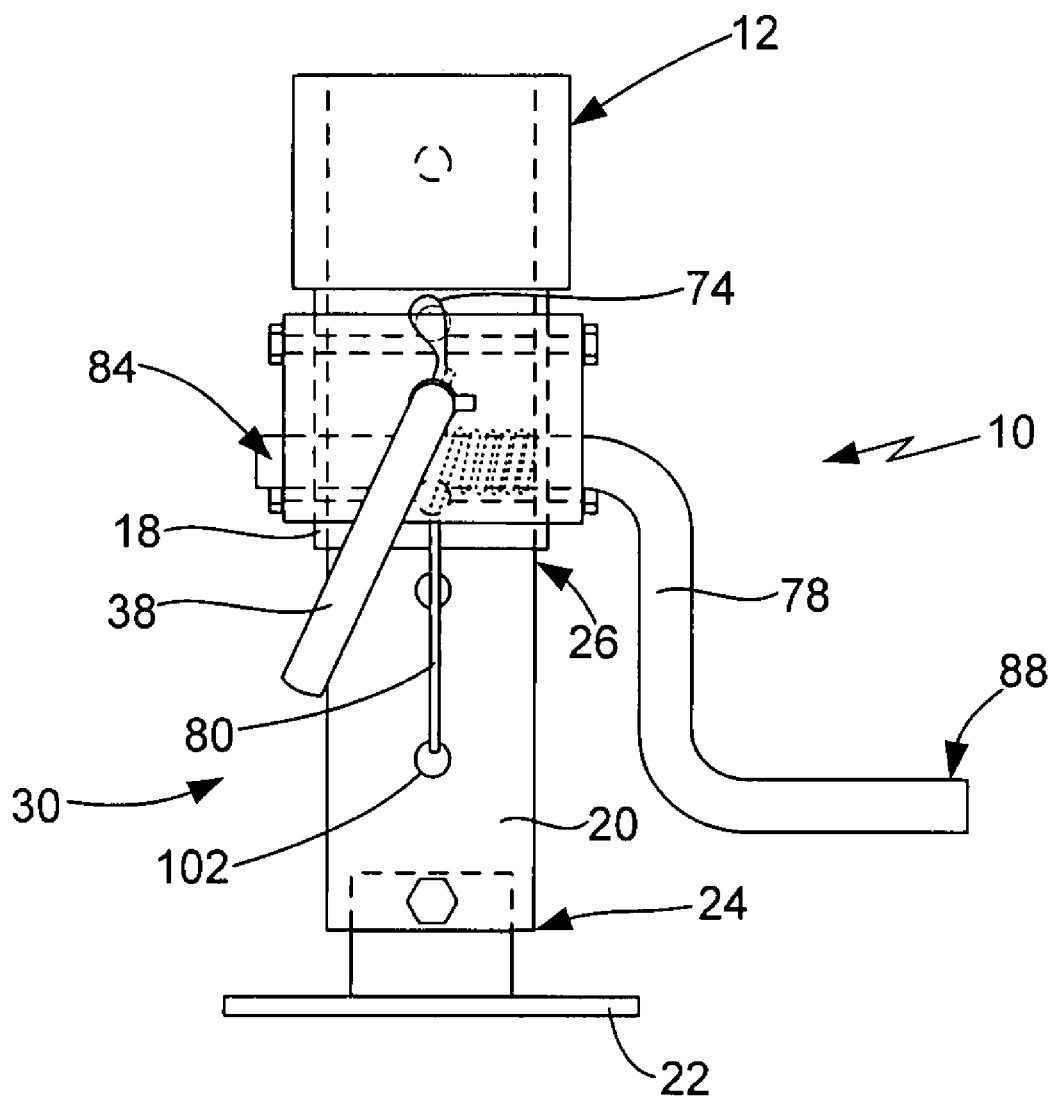
FIG. 6 is a side view of the support leg assistant and support leg of FIG. 4.

In a preferred embodiment of the present invention, shown in FIGS. 1 through 7, support leg assistant comprises an elongated housing member 32 having a first end 34 that attaches to the stationary outer tube 18 of support jack 12 and a second end 36 that extends outwardly of support jack 12, an elongated pin 38 that has a first end 40 which engages the support leg 20 inside outer tube 18 and a second end 42 that extends beyond the second end 36 of housing member 32, and a moving mechanism (shown generally as 44) for selectively moving the lower end 24 of support leg 20, and therefore the foot pad 22, between its lowered extended position 28 to its raised retracted position 30. As explained in more detail below, these components cooperate together to raise, lower and secure the position of support leg 20 relative to outer tube 18 so as to place the support jack 12 in an extended position 28 to support the fifth wheel trailer 16 or a retracted position 30 for moving trailer 16. As also explained below, this is partially accomplished by moving pin 38 between being in a spaced apart relation with support leg 20 to place support jack 12 in an unsecured position 46, as shown in FIG. 4, and being received in support leg 20 to place support jack 12 in a secured position 48, as shown in FIG. 5 (as well as FIGS. 1, 2 and 8).

Figure 2:
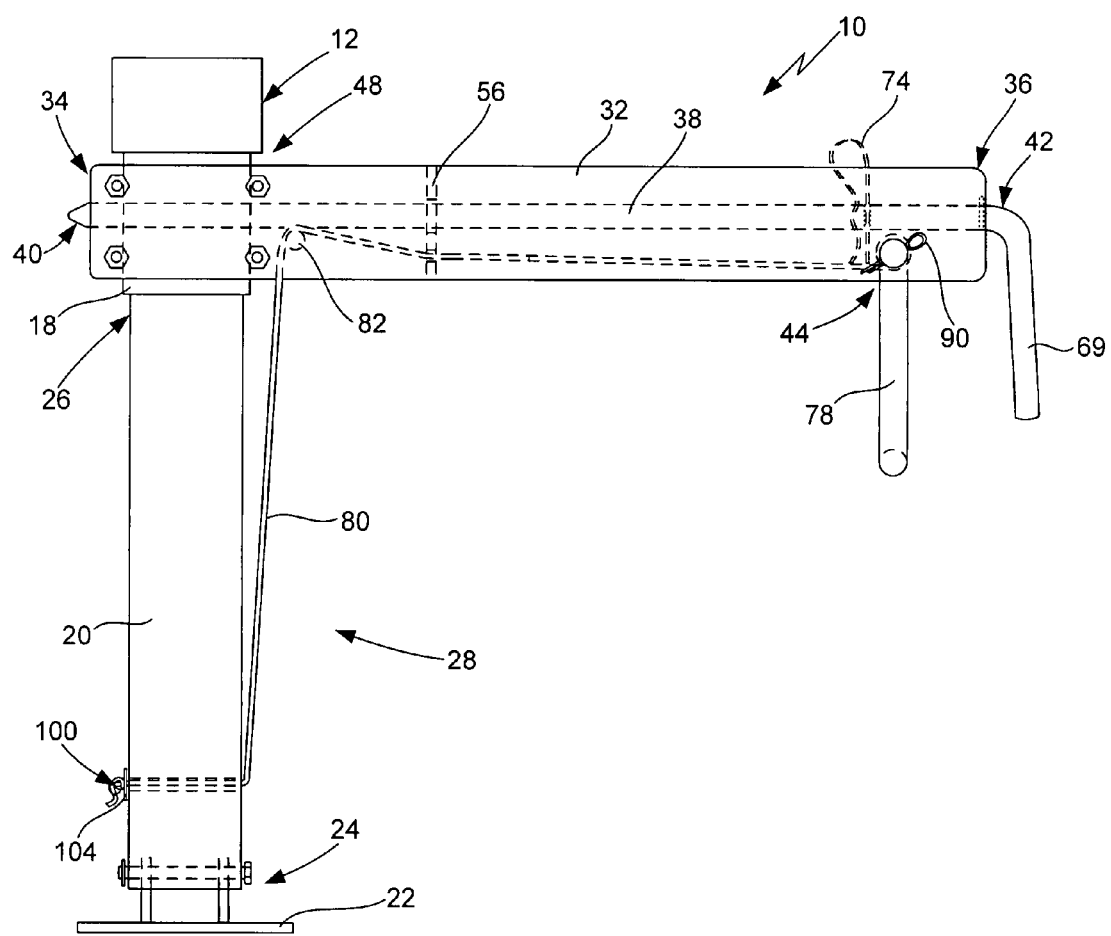
FIG. 2 is a front view of the support leg assistant of FIG. 1 shown attached to the support leg in its extended position.
Figure 3:
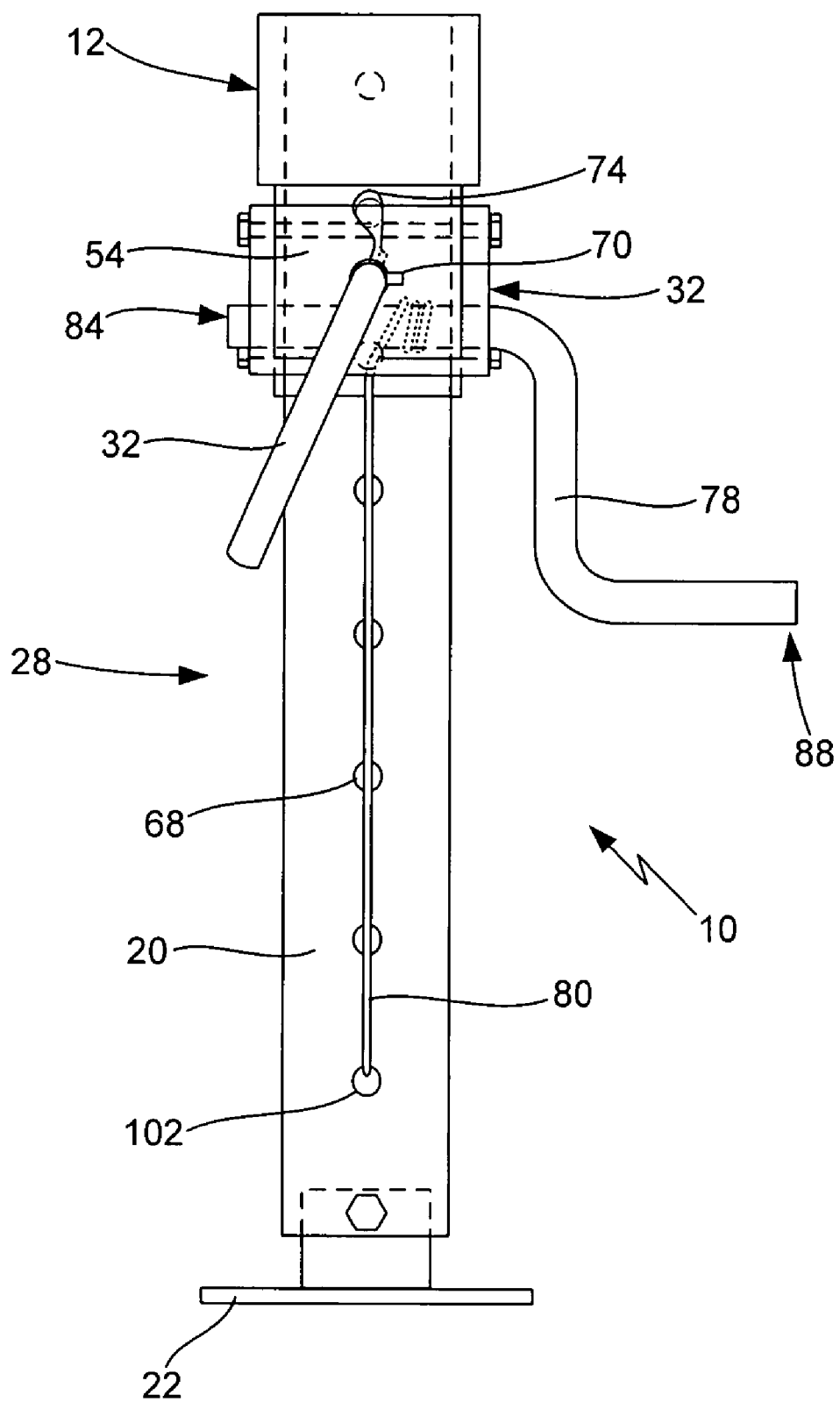
FIG. 3 is a side view of the support leg assistant and support leg of FIG. 2.
Figure 7:
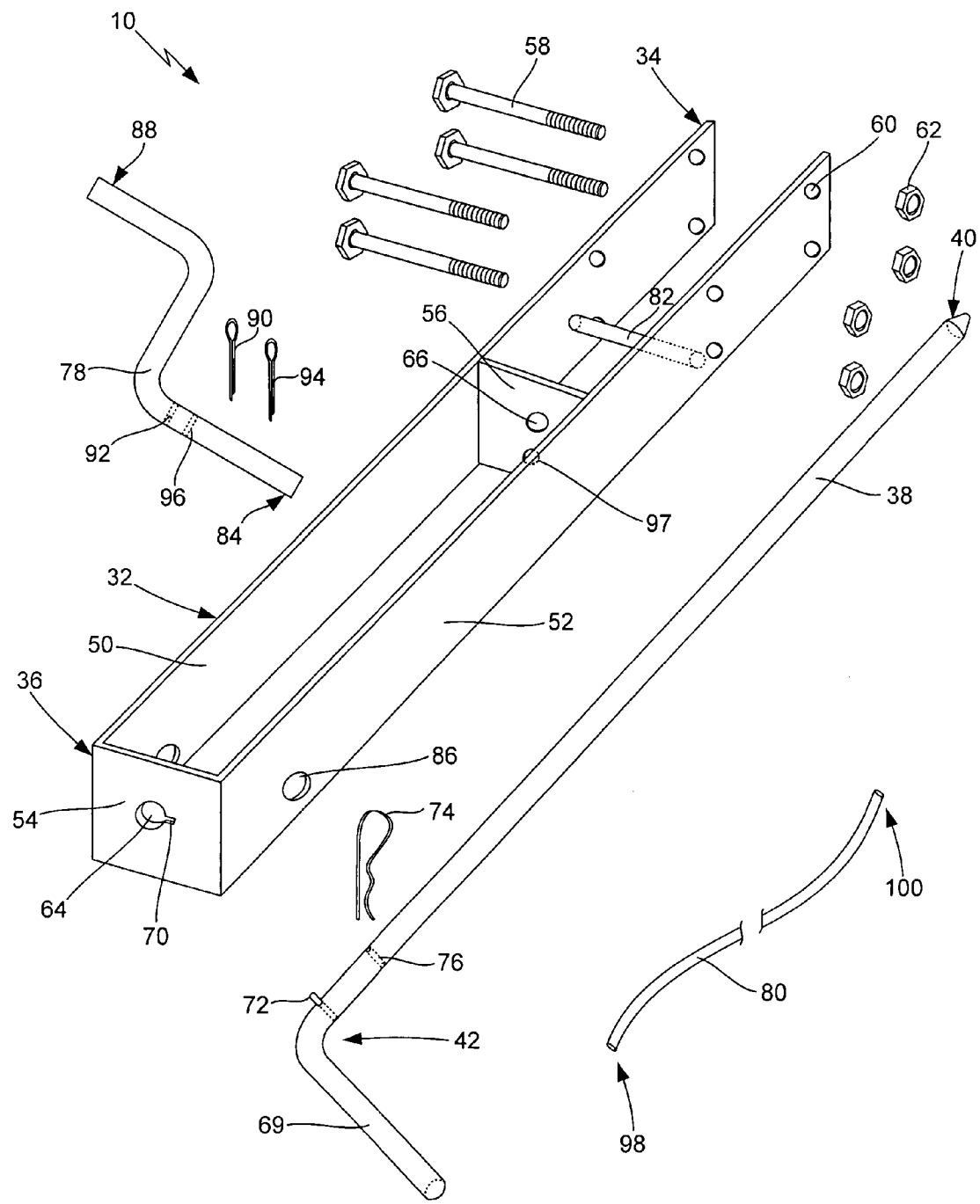
FIG. 7 is an exploded view of the components of the support leg assistant of the preferred embodiment of the present invention.

As best shown in FIG. 7, housing member 32 is preferably provided in a generally U-shaped configuration with the open end of the "U" at first end 34 and the closed end of the "U" at second end 36 and configured to extend generally horizontally outward (i.e., toward the edge of trailer 16) from support jack 12. In the preferred configuration, housing member 32 comprises a first side wall 50, second side wall 52 and an end wall 54 interconnecting the first 50 and second 52 side walls at the second end 36 of housing member. Alternatively, housing member 32 can comprise a generally tubular shaped member having a square, rectangular, circular or other cross-sectional shapes. A support plate 56 is disposed in housing member 32 at a position where it can provide stiffness towards the second end 36 of housing member 32 but allow some flexibility toward first end 34 thereof and support elongated pin 38 inside housing member 32. The open first end 34 simplifies installation by allowing the installer to slide first end 34 of housing member 32 around outer tube 18 of support jack 12, as shown in FIGS. 2, 4 and 5, so that it may be attached thereto. Although housing member 32 may be welded or otherwise fixedly attached to outer tube 18, it is preferred that housing member 32 be securely and removably attached to outer tube 18. In the preferred embodiment, first end 34 of housing member is clamped to outer tube 18. In one configuration, a plurality of bolts 58 are inserted through bolt apertures 60, shown in FIG. 7, at the first end 34 of housing member 32. In the configuration shown in the figures, four bolts 58 are inserted through four bolt apertures 60, with two bolts 58 being disposed on each side of outer tube 18. A nut 62, preferably a locking nut, secures the bolts 58 and squeezes the first 50 and second 52 side walls at the open first end 34 to clamp housing member 32 against outer tube 18. Preferably, housing member 32 is made out of a material that is sufficiently strong to provide stiffness for housing member 32 as it extends out horizontally from support jack 12 and to support the movement of elongated pin 38 and the weight of support leg 20 and foot pad 22 as moving mechanism 44 moves support leg 20 up or down. Because support leg assistant will be exposed to the elements, the material should also be corrosion resistant. Although a variety of materials can be utilized, including metals, plastics and composites, a preferred material is steel that has powder coated or otherwise treated to reduce corrosion.

As shown in FIGS. 2, 4 and 5, elongated pin 38 is received through and extends the length of housing member 32 such that its first end 40 can selectively engage the portion of support leg 20 disposed in outer tube 18 when support jack 12 is in its secured position 48 while its second end 42 extends beyond the second end 36 of housing member 32. In a preferred embodiment, elongated pin 38 passes through and is supported by an aperture 64 in the end wall 54 of housing member 32 and then passes through and is supported by an aperture 66 in support plate 56. First end 40 of pin 38 passes through one of the leg apertures 68 in support leg 20 to secure support leg in its extended position 28 or its retracted position 30. As shown in FIGS. 2, 4 and 5, preferably the first end 40 of pin 38 extends beyond the first end 34 of housing member 32 to ensure that pin 38 is securely engaged in the appropriate leg aperture 68. In a preferred embodiment, the second end 42 of elongated pin 38 is bent at a ninety degree angle to form a handle 69 integral with pin 38. Alternatively, handle 69 can be a separate component that is securely attached to the second end 42 of elongated pin 38. Pin 38 should be made out of a strong, stiff and durable material that is capable of supporting the weight of support leg 20 and foot pad 22 and exposure to the elements. In one embodiment, elongated pin 38 is made out of stainless steel or the like.

To prevent accidental or unintended removal of the first end 40 of pin 38 from support leg 20, which places support jack 12 in its unsecured position 46, as shown in FIG. 4, the preferred embodiment includes a securing mechanism for securing pin 38 in housing member 32. In one configuration, as best shown in FIG. 7, the securing mechanism comprises a key slot 70 at aperture 64 in end wall 54 that is cooperatively sized with a key member 72 on pin 38. Key slot 70 and key member 72 are cooperatively configured such that key member 72 must be properly aligned with key slot 70, by appropriately rotating or twisting elongated pin 38, in order to pull pin 38 outward so as to disengage the first end 40 of pin 38 from the leg aperture 68 which holds support jack 12 in the secured position 48. Failure to properly align key member 72 with key slot 70 will prevent sufficient outward movement of pin 38 that places support jack 12 in its unsecured position 46, which could result in the collapse of the support jack 12 if it was under load from trailer 16. For further safety, support leg assistant 10 also utilizes a securing pin 74 that is received in a securing aperture 76 in elongated pin 38, as best shown in FIG. 7, in a manner that prevents substantial movement (i.e., enough to disengage pin 38 from support leg 20) of elongated pin 38 when it is desired to maintain support jack 12 in its secured position 48. In one preferred configuration, securing pin 74 is a cotter pin or the like that is relatively easily inserted into securing aperture 76 and then removed therefrom by the operator when he or she moves between an unsecured position 46 and a secured position 48. Although either of these mechanisms, or like devices, can be utilized alone, it is preferred that they are utilized together to provide redundancy with regard to the securing mechanism.

As stated above, moving mechanism 44 is configured to allow the operator to selectively move the support leg 20 between its extended position 28 and its retracted position 30. In one preferred configuration, moving mechanism 44 comprises a crank 78 rotatably attached to housing member 32 near second end 36 of housing member 32, as best shown in FIGS. 2, 4 and 5, an elongated member 80 interconnecting crank 78 with the lower end 24 of support leg 20 and a guiding mechanism 82 disposed in housing member 32 between the crank 78 and the first end 34 of housing member 32 for directing the elongated member 80 to the lower end 24 of support leg 20. Crank 78 has a first end 84 that is received in crank apertures 86 near the second end 36 of housing member 32, as shown in FIG. 7, and a second end 88 that extends outwardly from housing member 32 a sufficient distance to serve as a handle for the operator to operate crank 78, as described below. To secure crank 78 in crank apertures 86, one embodiment of the present invention utilizes a first pin 90 received in a first aperture 92 on one side of first side wall 50 and a second pin 94 received in second aperture 96 on other side of first side wall 50 in a manner that secures crank 78 to housing member 32 but allows it to rotate therewith. In a preferred embodiment, the elongated member 80 is a cable, wire, cord, rope or like component that extends between crank 78 and the lower end 24 of support leg 20. In the embodiment shown, elongated member 80 passes through a second aperture 97 in support plate 56 prior to passing over guiding mechanism 82 to help keep elongated member properly aligned and away from the other components in housing member 32. First end 98 of elongated member 80 attaches to crank 78, either directly or indirectly (i.e., by connecting to second pin 94), and the second end 100 of elongated member 80 attaches to the very bottom leg aperture 102 at or near the lower end 24 of support leg 20 in order to raise leg 20 and foot pad 22. If desired, second end 100 of elongated member 80 can attach directly to foot pad 22. In the embodiment shown, second end 100 of elongated member 80 passes through the bottom leg aperture 102, passes through a washer 104 and is then tied off in a knot. Alternatively, the second end 100 can connect to a pin or the like that prevents it from being pulled back through bottom leg aperture 102 during the operation of crank 78. Guiding mechanism 82 in the embodiments of FIGS. 1 through 7 is a generally cylindrical pin or pin-like component that interconnects the first 50 and second 52 side walls of housing member 32 to allow elongated member 80 to pass over it as it changes direction from generally horizontal, passing through housing member 32, to generally vertical, as it goes downward to the lower end 24 of support leg 20. Although not shown, a variety of other devices, including the bolt shown in FIG. 8, can be utilized as guiding mechanism 82. One such device would be a pulley rotatably disposed in housing member 32 over which elongated member 80 passes.

Figure 8:
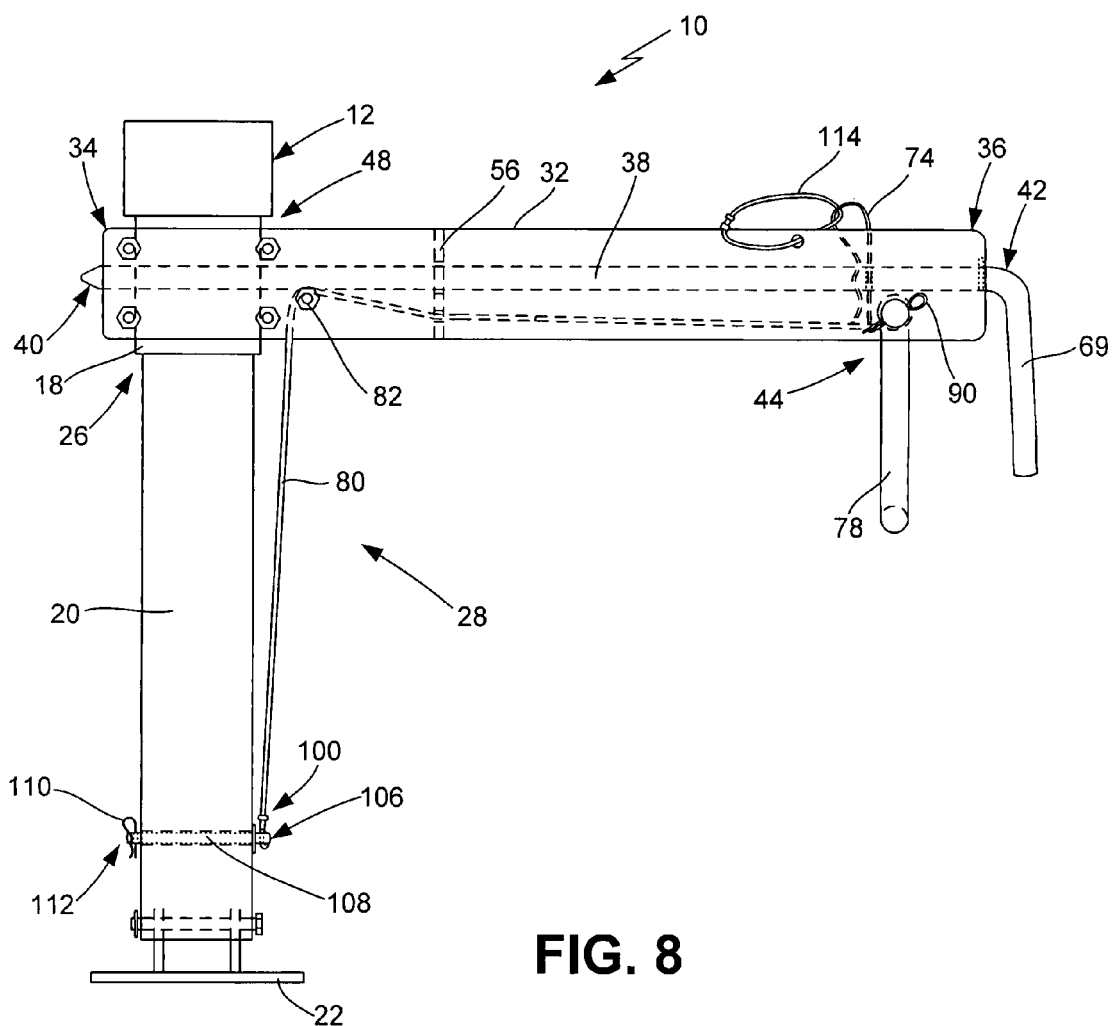
FIG. 8 is a front view of an alternative configuration of the support leg assistant of the present invention shown attached to a support leg.

In the embodiment of FIG. 8, the second end 100 of elongated member 80 connects to the first end 106 of a connecting pin 108 that is inserted through bottom leg aperture 102 to secure elongated member 80 to support leg 20. A pin, such as cotter pin 110, is inserted into an aperture at the second end 112 of connecting pin 108 to secure connecting in 108 in bottom leg aperture 102. Various other devices can be utilized to secure the second end 100 of elongated member 80 to the lower end 24 of support leg 20. For the convenience of the operator, support leg assistant 10 can also be provided with an attachment device 114, such as a ring, rope, wire or the like, that attaches securing pin 74 to housing member 32 so that it will not be lost when it is removed from elongated pin 38 to place support jack 12 in its unsecured position 48.

In the preferred embodiment, support leg assistant 10 is installed by placing the open first end 34 of housing member at the outer tube 18 of support jack 12 and clamping it tightly thereto using the four bolts 58 and nuts 62. The second end 100 of elongated member 80 is secured to the bottom leg aperture 102 and the elongated pin is inserted through aperture 64 in end wall 54 and through the first aperture 66 in support plate 56. In use, the operator removes securing pin 74 from securing aperture 76, grasps the handle 69, twists it to align key member 72 with key slot 70 and then pulls the elongated pin 38 outward to disengage it from the leg aperture 68 in outer tube 18 so as to allow support leg 20 to move freely of outer tube 18. If the support jack 12 was in its lowered extended position 28, the operator rotates crank 78 to reel in elongated member 80 and raise foot pad 22 off of the ground 25 and support leg 20 into outer tube 18. Once foot pad 22 is sufficiently raised, the operator twists elongated pin to align key member 72 with key slot 70 and pushes elongated pin 38 inward to engage the first end 40 thereof with the aperture 68 now in outer tube 18 and in alignment with housing member 32. The operator then reinserts securing pin 74 into securing aperture 76. If the support jack 12 was in the raised retracted position 30, the operator repeats the above steps except that he or she will likely not need to rotate crank 78 to lower foot pad 22 as the weight thereof is generally sufficient to pull support leg 20 and elongated member 80 down.

While there are shown and described herein a specific form of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape, and use. For instance, there are numerous components described herein that can be replaced with equivalent functioning components to accomplish the objectives of the present invention.

What is claimed is:

1. A support leg assistant for a support jack having a telescoping support leg received therein, comprising:
    an elongated housing member having a first end attached to a stationary component of said support jack and a second end extending outwardly of said support jack;
    an elongated pin having a first end and a second end, said pin received through and extending the length of said housing member such that said first end of said pin may selectively engage said support leg in said stationary component when said support jack is in a secured position and said second end of said pin extends beyond said second end of said housing member; and
    moving means interconnecting said housing member and a lower end of said support leg for moving said support leg between a retracted position and an extended position, said moving means comprising a crank rotatably attached to said housing member near said second end thereof, an elongated member interconnecting said crank and said lower end of said support leg and a guiding mechanism disposed in said housing member between said crank and said first end of said housing member for directing said elongated member to said lower end of said support leg.

2. The support leg assistant according to claim 1, wherein said housing member is generally U-shaped with said first end being open and said second end being closed.

3. The support leg assistant according to claim 2, wherein said first end of said housing member is clamped to said support jack.

4. The support leg assistant according to claim 1, wherein said housing member extends generally horizontally from said support jack.

5. The support leg assistant according to claim 4, wherein said second end of said housing member is at or near an edge of an object supported by said support jack.

6. The support leg assistant according to claim 1 further comprising a support plate disposed in said housing member, said pin extending through an aperture in said support plate.

7. The support leg assistant according to claim 1 further comprising means for securing said first end of said pin in said support leg so as to maintain said support jack in a secured position.

8. The support leg assistant according to claim 7, wherein said securing means comprises a key slot at said second end of said housing member and a correspondingly configured key member on said pin, said key member configured to fit through said key slot so as to place said support jack in a released position.

9. The support leg assistant according to claim 8, wherein said securing means further comprises a securing pin received in a securing aperture in said pin, said securing pin configured to prevent removal of said pin from said support leg when in said securing aperture so as to maintain said secured position.

10. The support leg assistant according to claim 7, wherein said securing means comprises a securing pin received in a securing aperture in said pin, said securing pin configured to prevent removal of said pin from said support leg when in said securing aperture so as to maintain said secured position.

11. A support leg assistant for a support jack having a telescoping support leg received therein, comprising:
    an elongated generally U-shaped housing member having an open first end attached to a stationary component of said support jack and a second end extending generally horizontally outwardly from said support jack;

an elongated pin having a first end and a second end, said pin received through and extending the length of said housing member such that said first end of said pin may selectively engage said support leg in said stationary component when said support jack is in a secured position with said second end of said pin extending beyond said second end of said housing member;

securing means for securing said first end of said pin in said support leg so as to maintain said support jack in a secured position. said securing means having a securing pin received in a securing aperture in said pin, said securing pin configured to prevent removal of said pin from said support leg when in said securing aperture so as to maintain said secured position;

a handle at said second end of said pin; and moving means interconnecting said housing member and a lower end of said support leg for moving said support leg between a retracted position and an extended position.

12. The support leg assistant according to claim 11, wherein said securing means further comprises a key slot at said second end of said housing member and a correspondingly configured key member on said pin, said key member configured to fit through said key slot so as to place said support jack in a released position.

13. The support leg assistant according to claim 11, wherein said moving means comprises a crank rotatably attached to said housing member near said second end thereof, an elongated member interconnecting said crank and said lower end of said support leg and a guiding mechanism disposed in said housing member between said crank and said first end of said housing member for directing said elongated member to said lower end of said support leg.

14. A support leg assistant for use in combination with a support jack having a telescoping support leg received therein to support a trailer over said support jack, said support leg assistant comprising:

an elongated housing member having a first end attached to a stationary component of said support jack and a second end extending generally horizontally outwardly from said support jack, said second end of said housing member at or near an edge of said trailer;

an elongated pin having a first end and a second end, said pin received through and extending the length of said housing member such that said first end of said pin selectively engages said support leg in said stationary component when said support jack is in a secured position with said second end of said pin extending beyond said second end of said housing member;

a handle at said second end of said pin; and moving means interconnecting said housing member and a lower end of said support leg for moving said support leg between a retracted position and an extended position, said moving means having a crank rotatably attached to said housing member near said second end thereof, an elongated member interconnecting said crank and said lower end of said support leg and a guiding mechanism disposed in said housing member between said crank and said first end of said housing member for directing said elongated member to said lower end of said support leg.

15. The support leg assistant according to claim 14 further comprising means for securing said first end of said pin in said support leg so as to maintain said support jack in a secured position.

16. The support leg assistant according to claim 15, wherein said securing means comprises a key slot at said second end of said housing member and a correspondingly configured key member on said pin, said key member configured to fit through said key slot so as to place said support jack in a released position.

17. The support leg assistant according to claim 16, wherein said securing means further comprises a securing pin received in an securing aperture in said pin, said securing pin configured to prevent removal of said pin from said support leg when in said securing aperture so as to maintain said secured position.

18. The support leg assistant according to claim 15, wherein said securing means comprises a securing pin received in an securing aperture in said pin, said securing pin configured to prevent removal of said pin from said support leg when in said securing aperture so as to maintain said secured position.

* * * * *